(12) United States Patent
Lu

(10) Patent No.: US 7,872,863 B2
(45) Date of Patent: Jan. 18, 2011

(54) PORTABLE ELECTRONIC DEVICE

(75) Inventor: Chi-Chung Lu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 90 days.

(21) Appl. No.: 12/429,281

(22) Filed: Apr. 24, 2009

(65) Prior Publication Data

US 2009/0323278 A1      Dec. 31, 2009

(51) Int. Cl.
*H05K 7/14* (2006.01)

(52) U.S. Cl. ............................ 361/679.56; 361/679.55; 361/727; 455/575.3; 455/575.4

(58) Field of Classification Search ............ 361/679.01, 361/679.02, 679.08, 79.09, 679.19, 679.3, 361/679.55, 679.26, 679.56, 724–727; 455/575.1–575.4; 379/433.11–433.13; 248/917–924
See application file for complete search history.

(56) References Cited

U.S. PATENT DOCUMENTS 7,099,708 B2 * 8/2006 Ronkko ................... 455/575.1
7,512,428 B2 * 3/2009 An et al. ................... 455/575.3

* cited by examiner

*Primary Examiner*—Jayprakash N Gandhi
*Assistant Examiner*—Ingrid Wright
(74) *Attorney, Agent, or Firm*—Steven M. Reiss

(57) ABSTRACT

A portable electronic device comprises a main body, a sliding cover slidably mounted on the main body, a flipping cover rotatably mounted on one end of the main body, and a transmission mechanism connecting the flipping cover to the sliding cover such that when the flipping cover rotates relative to the main body, the sliding cover slides relative to the main body.

12 Claims, 5 Drawing Sheets

PORTABLE ELECTRONIC DEVICE

BACKGROUND

1. Technical Field

The present disclosure relates to portable electronic devices and, particularly, to a flipping and sliding type portable electronic device.

2. Description of Related Art

With the development of wireless communication and information processing technologies, portable electronic devices such as notebook computers, mobile phones, and personal digital assistants (PDAs) are now in widespread use. These electronic devices enable consumers to enjoy high technology services almost anytime and anywhere. Rapid development in the field of information and telecommunication technologies has made it possible for portable electronic devices users to use a variety of functions and types of portable electronic devices available on the market. Generally, these portable electronic devices can be classified into three or more types including bar type, flipping type and sliding type.

A sliding type portable electronic device usually includes a first body, a second body and a sliding-type mechanism. The first body has a display disposed thereon. A plurality of keys is located on the second body. The sliding-type mechanism is used to drive the first body to slide on the second body between an opened state and a closed state. However, the sliding distance of the first body is limited by the sliding-type mechanism. The sliding distance of the first body usually cannot exceed ⅔ length of the second body. Therefore, the second body only has ⅔ area to define the keys thereon. Due to the area of defining the keys being relatively small, the size of the keys may be limited. Such small keys may be inconvenient to be operated by users.

Therefore, there is a room for improvement within the art.

BRIEF DESCRIPTION OF THE DRAWINGS

Many aspects of the portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF EMBODIMENTS

Figure 1:
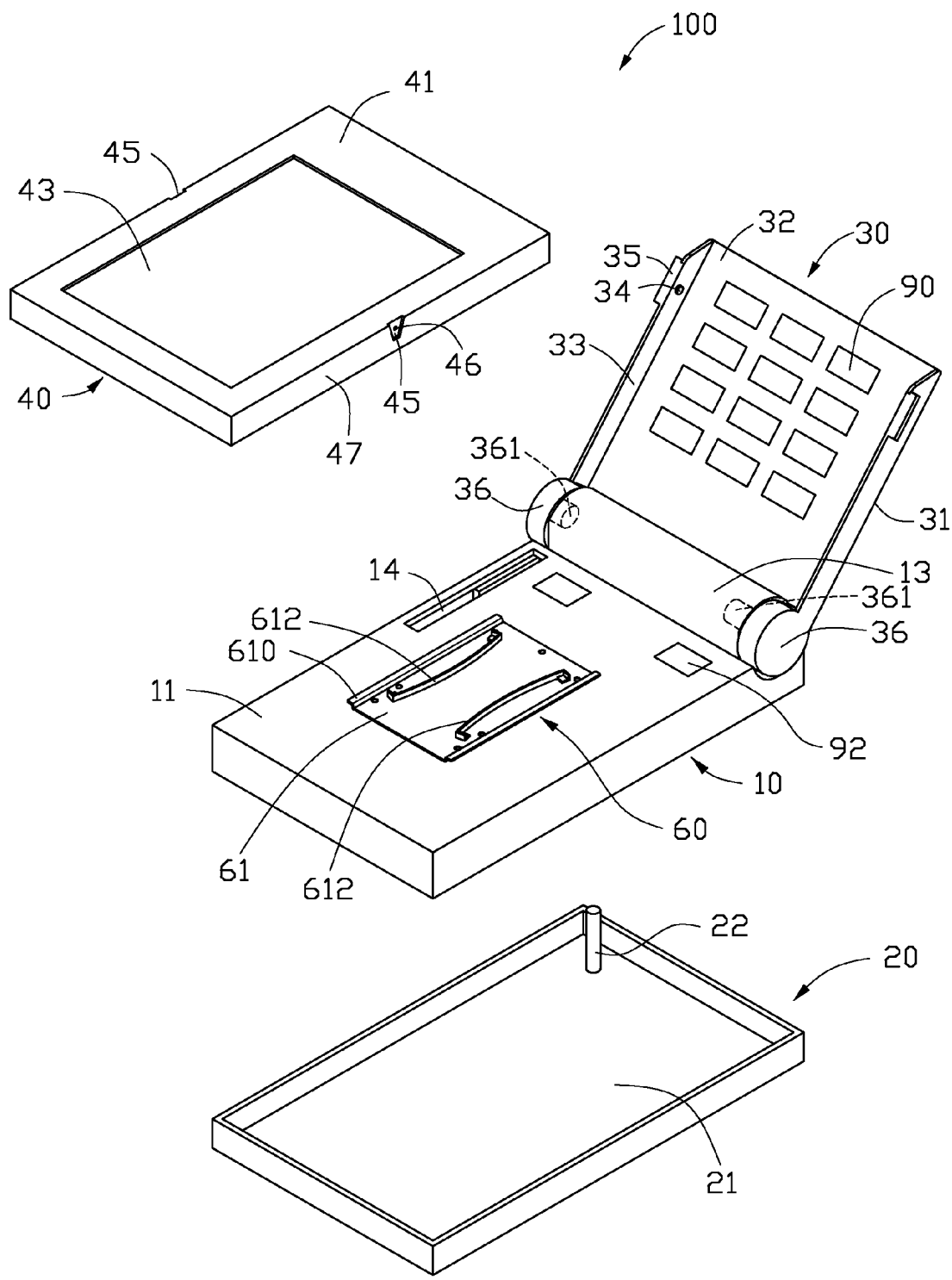
FIG. 1 is an exploded view of a portable electronic device.
Figure 2:
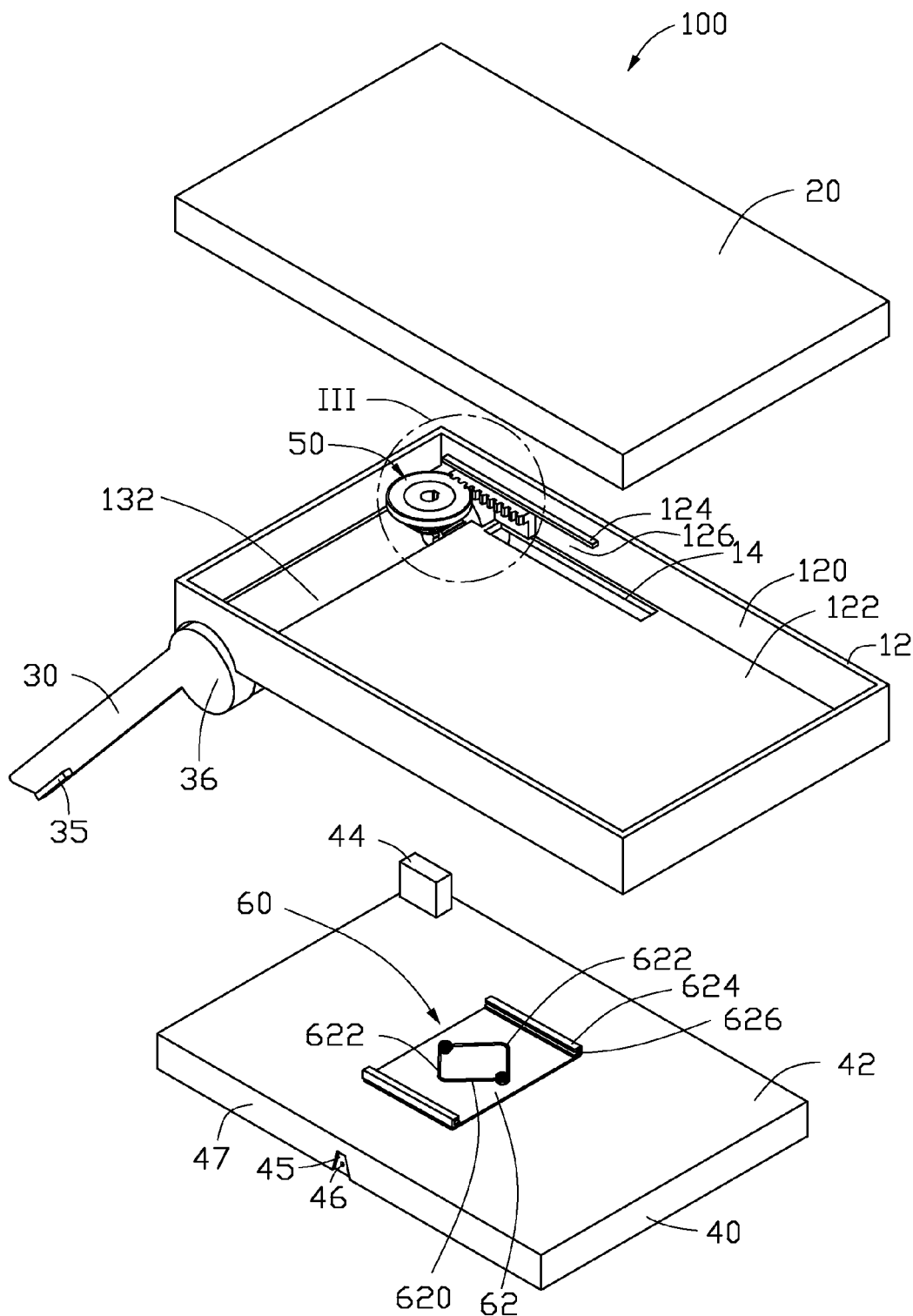
FIG. 2 is similar to FIG. 1, but viewed from another aspect.

Referring now to the drawings in detail, FIGS. 1 and 2, show a portable electronic device 100 including a top body 10, a bottom body 20, a flipping cover 30, a sliding cover 40, a transmission mechanism 50, and a sliding mechanism 60.

The top body 10 is a substantially rectangular structure including a body portion 11, a periphery portion 12 vertically extending from peripheral edge of the body portion 11, and a sleeve 13 positioned at one end of the body portion 11. The body portion 11 has a plurality of operating keys 92 disposed thereon and a guiding slot 14 defined therein. The guiding slot 14 passes through the body portion 11. The periphery portion 12 includes four sidewalls 120 defining a chamber 122. The sleeve 13 defines a notch 132 communicating with the chamber 122. One of the four sidewall has a rib 124 secured thereon. The rib 124 is horizontally positioned along one of the sidewalls and is parallel to the body portion 11. The body portion 11 and the rib 124 define a sliding slot 126 therebetween.

The bottom body 20 is substantially rectangular and includes an upper surface 21 facing to the top body 10, and a positioning post 22 perpendicularly positioned on a corner of the upper surface 21.

The flipping cover 30 is substantially rectangular including a first surface 31 and a second surface 32 positioned opposite to the first surface 31. Two sides of the flipping cover 30 are respectively bent to form an edgefold 33. The second surface 32 defines a plurality of keys 90. Each edgefold 33 has a clasp 34 inwardly defined thereon, and an extending piece 35 perpendicularly extending therefrom. Each extending piece 35 is configured for facilitating opening of the flipping cover 30. Each of two sides of the flipping cover 30 extends a junction 36 located apart from the extending piece 35. Each junction 36 is a substantially circular structure extending a shaft 361. Each shaft 361 is inserted in the sleeve 13 to assemble the flipping cover 30 on the top body 10.

The sliding cover 40 is substantially rectangular including a top surface 41, a bottom surface 42 at an opposite side of the top surface 41, and two side portions 47 located opposite to each other. The top surface 41 has a display 43. A protruding portion 44 is positioned on a corner of the bottom surface 42. The protruding portion 44 can be slidably received in the guiding slot 14. Each of the side portions 47 includes a recess portion 45 defining a blind hole 46. When the flipping cover 30 is closed, the clasp 34 is inserted into the blind hole 46 to secure the sliding cover 40 to the flipping cover 30.

Figure 3:
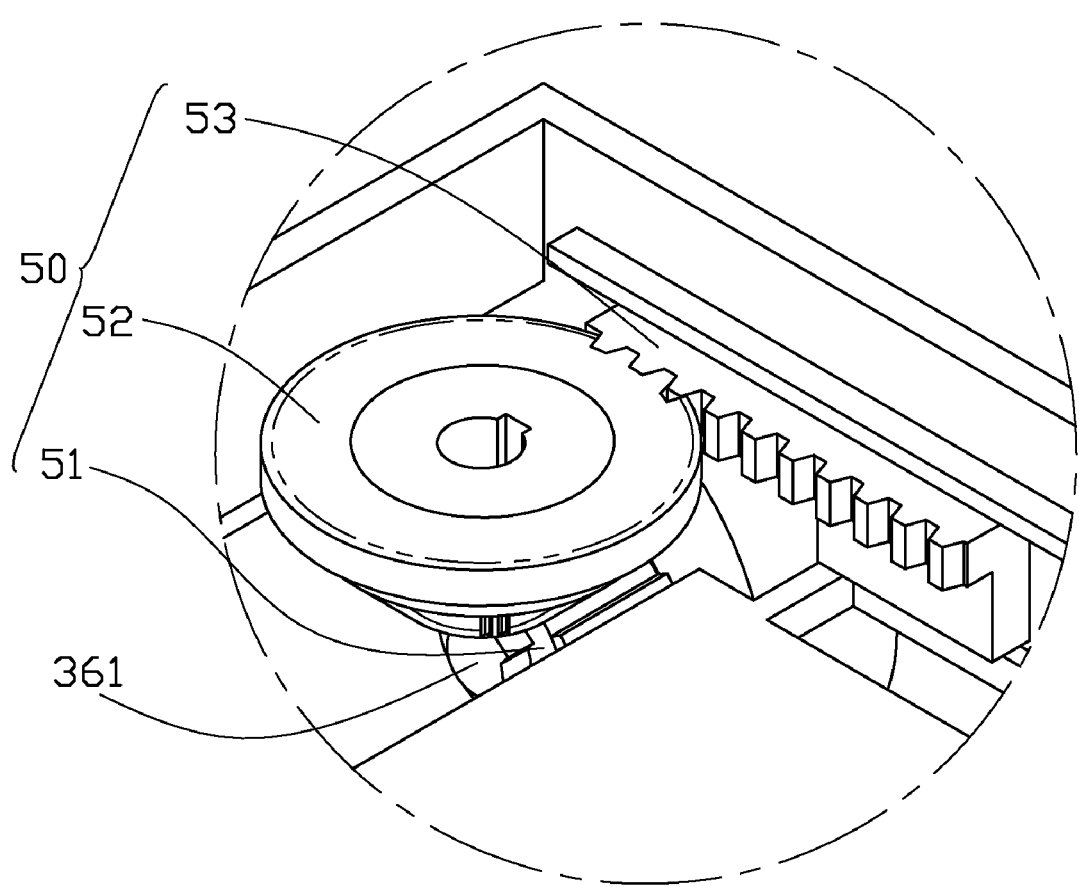
FIG. 3 is an enlarged view of III shown in FIG. 2.

Referring to FIG. 3 together, the transmission mechanism 50 includes a first gear 51, a second gear 52 and a rack 53. The first gear 51 is a bevel gear, and assembled on the shaft 361, and revolves with the flipping cover 30. The second gear 52 is a bevel gear, and revolvably assembled on the positioning post 22 and engages with the first gear 51. The rack 53 is received in the sliding slot 126 and engages with the second gear 52. The second gear 52 drives the rack 53 to slide in the sliding slot 126.

The sliding mechanism 60 includes a base 61 fixed on the top body 10 and a sliding plate 62 fixed on the sliding cover 40. Each of two sides of the base 61 is bent to form a sliding guide 610 parallel to the base 61. Two ends of each of the guiding parts 612 are fixed on the base 61. Each of the guiding parts 612 is a generally arc-shaped flexible structure. The distance between two guiding parts 612 decreases from the ends to the middles thereof.

The sliding plate 62 includes a substantially rhombic guiding portion 620. The guiding portion 620 has two function portions 622 facing to each other. Each of the function portions 622 is a L-shaped structure and configured for resisting the guiding parts 612. A guiding block 624 is fixed on two sides of the sliding plate 62. Each guiding block 624 is a generally U-shaped bar and defines a slide groove 626 configured for linearly and slidably receiving the sliding guide 610. When the sliding plate 62 is pushed on the sliding guide 610 by an external force, the sliding plate 62 slides on the sliding guide 610.

Figure 4:
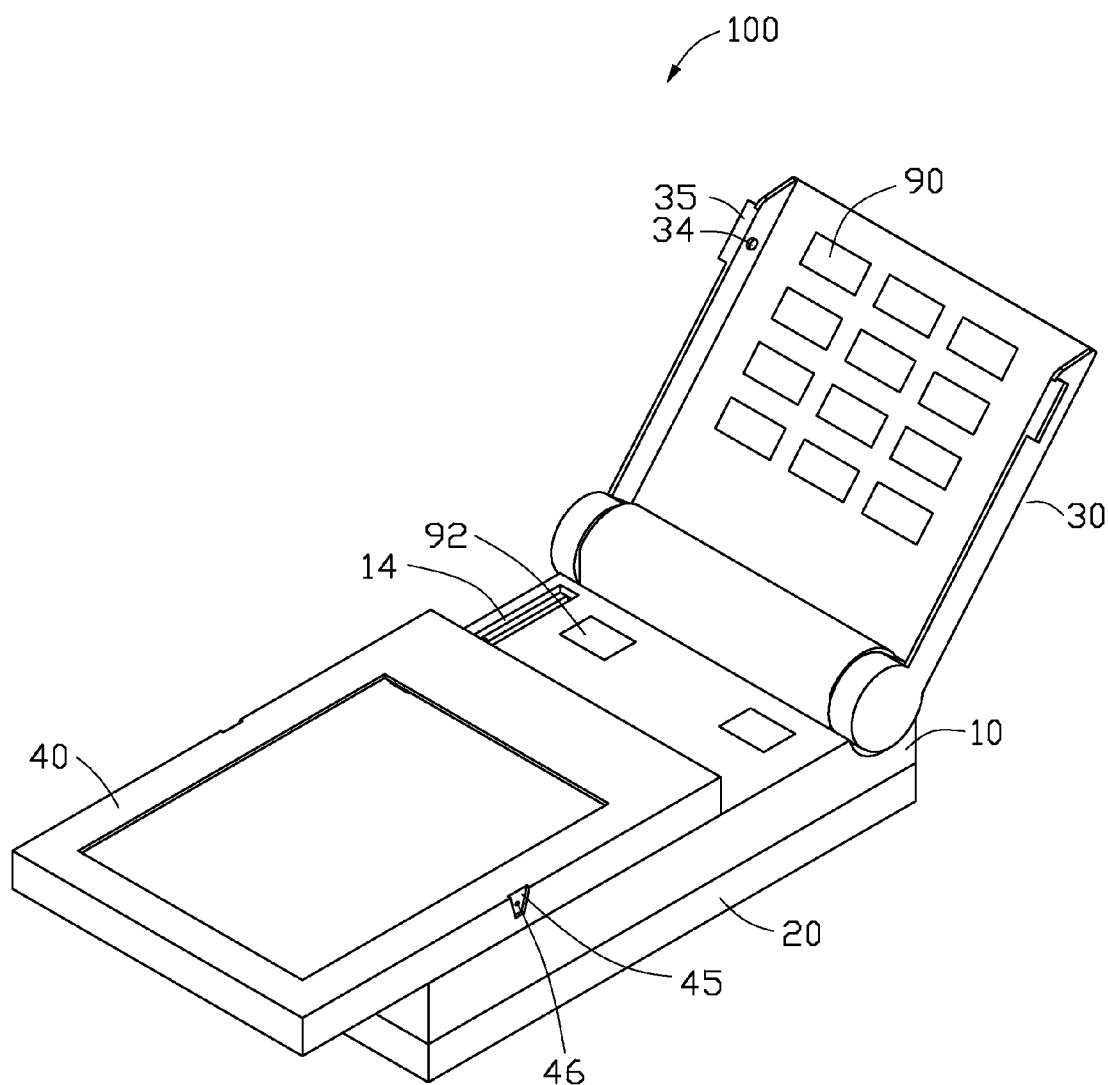
FIG. 4 is a schematic view of the portable electronic device in an opened position.

Referring to FIG. 4 together, in assembly of the portable electronic device 100, the second gear 52 is assembled on the positioning post 22. The top body 10 is mounted onto the bottom body 20. The second gear 52 engages with the first gear 51 and the rack 53. The sliding cover 40 covers a part of the body portion 11 and the sliding guide 610 engages with the guiding block 624. Each sliding guide 610 is linearly and slidably received in the slide groove 626. The function portions 622 respectively engage with the guiding parts 612. The protruding portion 44 is received in the guiding slot 14. Therefore, the sliding cover 40 is slidably assembled on the top body 10.

Figure 5:
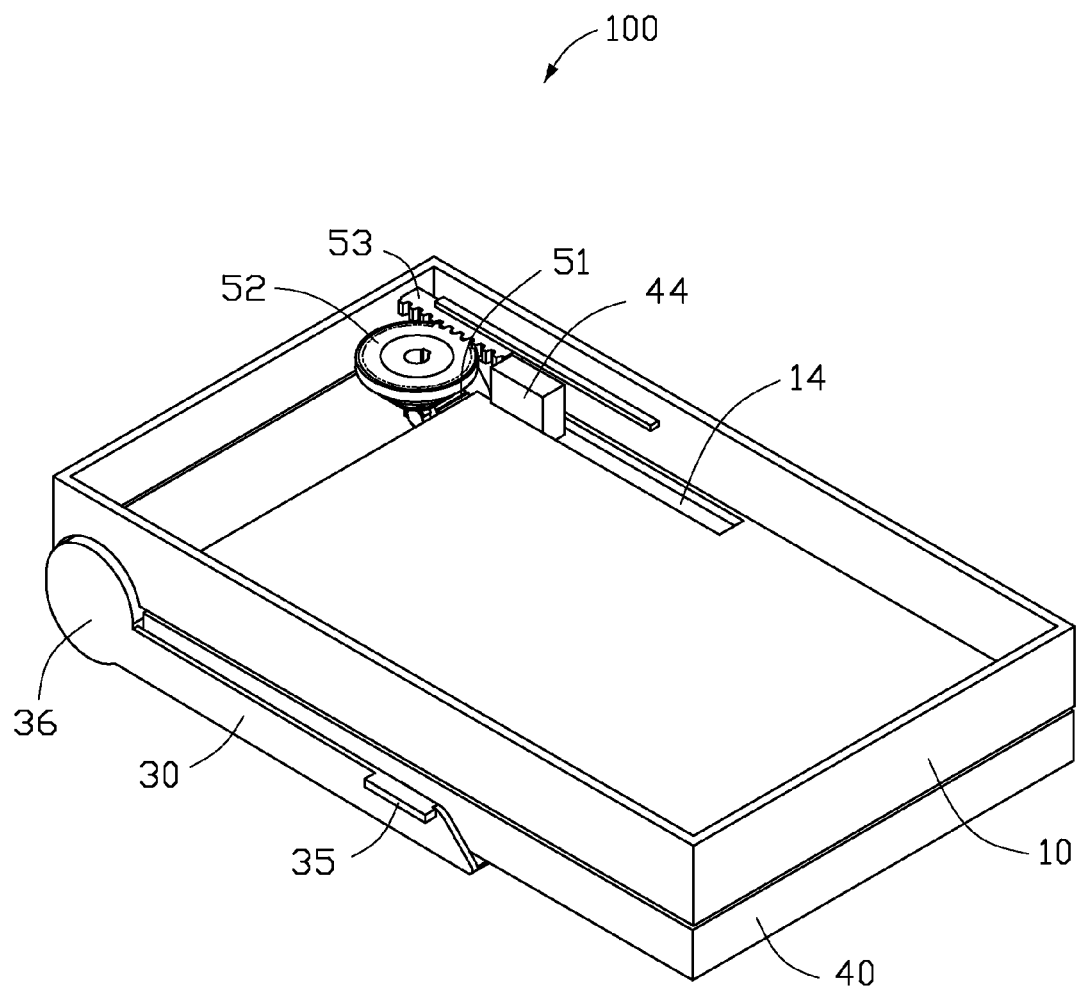
FIG. 5 is similar to FIG. 4, but viewed in a closed status.

Referring to FIG. 5, when the portable electronic device 100 is opened, the clasp 34 departs from the recess portion 45, and the flipping cover 30 is revolved by external force exerted on each extending piece 35. The first gear 51 rotates with the flipping cover 30 and revolves the second gear 52. The rack 53 slides in the sliding slot 126 by the second gear 52 and moves away from the sleeve 13. The rack 53 resists the protruding portion 44, and the sliding cover 40 is slidable on the top body 10. When the second gear 52 engages with an end of the rack 53, the rack 53 reaches its maximum movable length, and the flipping cover 30 reaches its maximum flipping angle. At the same time, the function portions 622 reach the middle of the guiding parts 612. The guiding portion 620 can automatically slide by the guiding parts 612. Therefore, the protruding portion 44 moves away from the rack 53, and the sliding cover 40 is automatically opened.

When the portable electronic device 100 is closed, the sliding cover 40 slides back to the sleeve 13. When the function portions 622 reach the middle of the guiding parts 612, the guiding parts 612 are maximally deformed. The function portions 622 can further automatically slide by biasing the guiding parts 612 to return to their original states. The protruding portion 44 resists the rack 53 and drives the rack 53 sliding in the sliding slot 126. The second gear 52 revolves with the rack 53 and drives the first gear 51 to reversely revolve.

It is to be understood that the top body 10 and the bottom body 20 can be seems as a main body of the portable electronic device 100 when the top body 10 and the bottom body 20 combine together.

It is to be understood that the rib 124 can be omitted, the sliding slot 126 is defined in one of the four sidewalls 120.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
a main body;
a sliding cover slidably mounted on the main body;
a flipping cover rotatably mounted on one end of the main body; and
a transmission mechanism connecting the flipping cover to the sliding cover such that when the flipping cover rotates relative to the main body, the sliding cover slides relative to the main body, wherein the transmission mechanism comprises a first gear, a second gear engaging with the first gear, and a rack, the first gear being secured on the flipping cover and revolves with the flipping cover, the second gear being removably assembled on the main body, the rack being slidably assembled in the main body and engages with the second gear and wherein the first gear and the second gear both are bevel gears.

2. The portable electronic device as claimed in claim 1, wherein the main body comprises a top body defining a guiding slot, and a bottom body combining with the top body, the top body has a sleeve disposed thereon, the bottom body has a positioning post extending therefrom.

3. The portable electronic device as claimed in claim 2, wherein the top body has a sliding slot horizontally positioned along a sidewall thereof, the sliding cover has a protruding portion resisting to the rack, the rack drives the protruding portion to slide in the guiding slot.

4. The portable electronic device as claimed in claim 2, wherein the top body has a rib horizontally secured along a sidewall thereof and parallel to the top body, the top body and the rib define a sliding slot therebetween, the sliding cover having a protruding portion resisting the rack, the rack drives the protruding portion to slide in the guiding slot.

5. The portable electronic device as claimed in claim 1, wherein the portable electronic device further comprises a sliding mechanism including a base secured on the main body, and a sliding plate slidably assembled on the base and secured on the flipping cover.

6. The portable electronic device as claimed in claim 1, wherein the sliding cover has two side portions respectively defining a recess portion, two sides of the flipping cover respectively extends an edgefold having a clasp, each clasp inserts into the recess portion configured for locking the flipping cover.

7. The portable electronic device as claimed in claim 6, wherein each of the edgefold has an extending piece extending therefrom configured for opening the flipping cover.

8. A portable electronic device, comprising:
a main body comprising a top body and a bottom body mounted on the top body;
a sliding cover slidably mounted on the top body;
a flipping cover rotatably mounted on one end of the top body; and
a transmission mechanism connecting the flipping cover to the sliding cover, comprising:
a first gear revolved with the flipping cover,
a second gear revolvably assembled on the bottom body and engaging with the first gear, and
a rack slidably assembled in the top body and engaging with the second gear;
wherein the first gear is revolved with the flipping cover to drive the second gear,
which drives the rack sliding in the top body, the rack resist to the sliding cover relative opening to the main body.

9. The portable electronic device as claimed in claim 8, wherein the top body defines a guiding slot passing through the top body, the sliding cover has a protruding portion slidably received in the guiding slot.

10. The portable electronic device as claimed in claim 9, wherein the top body has a sliding slot horizontally positioned along a sidewall thereof, the protruding portion resisting to the rack sliding in the sliding slot, the rack drives the protruding portion to slide in the guiding slot.

11. The portable electronic device as claimed in claim 9, wherein the top body has a rib horizontally secured along a sidewall thereof and parallel to the body portion, the top body and the rib define a sliding slot therebetween, the protruding portion resisting the rack sliding in the sliding slot, the rack drives the protruding portion to slide in the guiding slot.

12. The portable electronic device as claimed in claim 8, wherein the first gear and the second gear both are bevel gears.

* * * * *